United States Patent [19]

Francois

[11] Patent Number: 5,732,608
[45] Date of Patent: Mar. 31, 1998

[54] HIGH-PRECISION REVOLVING CENTER

[75] Inventor: Bernard Gilbert Henri Francois, Champforgeuil, France

[73] Assignee: Eastman Kodak Company, Rochester, N.Y.

[21] Appl. No.: 644,786

[22] Filed: May 10, 1996

[30] Foreign Application Priority Data

May 15, 1995 [FR] France ................... 95 05944

[51] Int. Cl.⁶ ................................................. B23B 23/04
[52] U.S. Cl. .................................... 82/150; 142/53
[58] Field of Search ........................ 82/150, 148, 170, 82/151; 142/53

[56] References Cited

U.S. PATENT DOCUMENTS

| | | | |
|---|---|---|---|
| 2,366,806 | 1/1945 | Roofe | 82/150 |
| 2,547,858 | 4/1951 | Dearborn | 82/150 |
| 3,316,785 | 5/1967 | Nakane | 82/150 |

FOREIGN PATENT DOCUMENTS

| | | |
|---|---|---|
| 906513 | 2/1944 | France . |
| 901594 | 7/1945 | France ................... 82/150 |
| 2046637 | 5/1970 | France . |
| 7112945 | 4/1971 | France . |
| 2133205 | 11/1972 | France . |
| 2 454 863 | 4/1980 | France . |
| 1119626 | 1/1957 | Germany . |
| 2147577 | 9/1971 | Germany . |
| 721744 | 3/1952 | United Kingdom . |

*Primary Examiner*—Steven C. Bishop
*Assistant Examiner*—Mark Williams
*Attorney, Agent, or Firm*—Mark G. Bocchetti

[57] ABSTRACT

The invention relates to a high-precision revolving center (10) for machine tools. Prestressed bearings 40 and 45 are brought into abutment on the one hand against internal 33 and external 25 cylindrical surfaces whose deviation, at any point on the surface, with respect to the theoretical surfaces centered on the axis, is less than 1 μm, and on the other hand against reference surfaces 26 and 34 perpendicular to the axis. Threaded elements 50, 55 enable the bearings 40, 45 to be stressed. Once the center 10 has been assembled and the bearings stressed, the revolving center is mounted on a grinder in order to give a precision finish to the tip 90, the concentricity reference surface 91 and the perpendicularity reference surface 92.

7 Claims, 2 Drawing Sheets

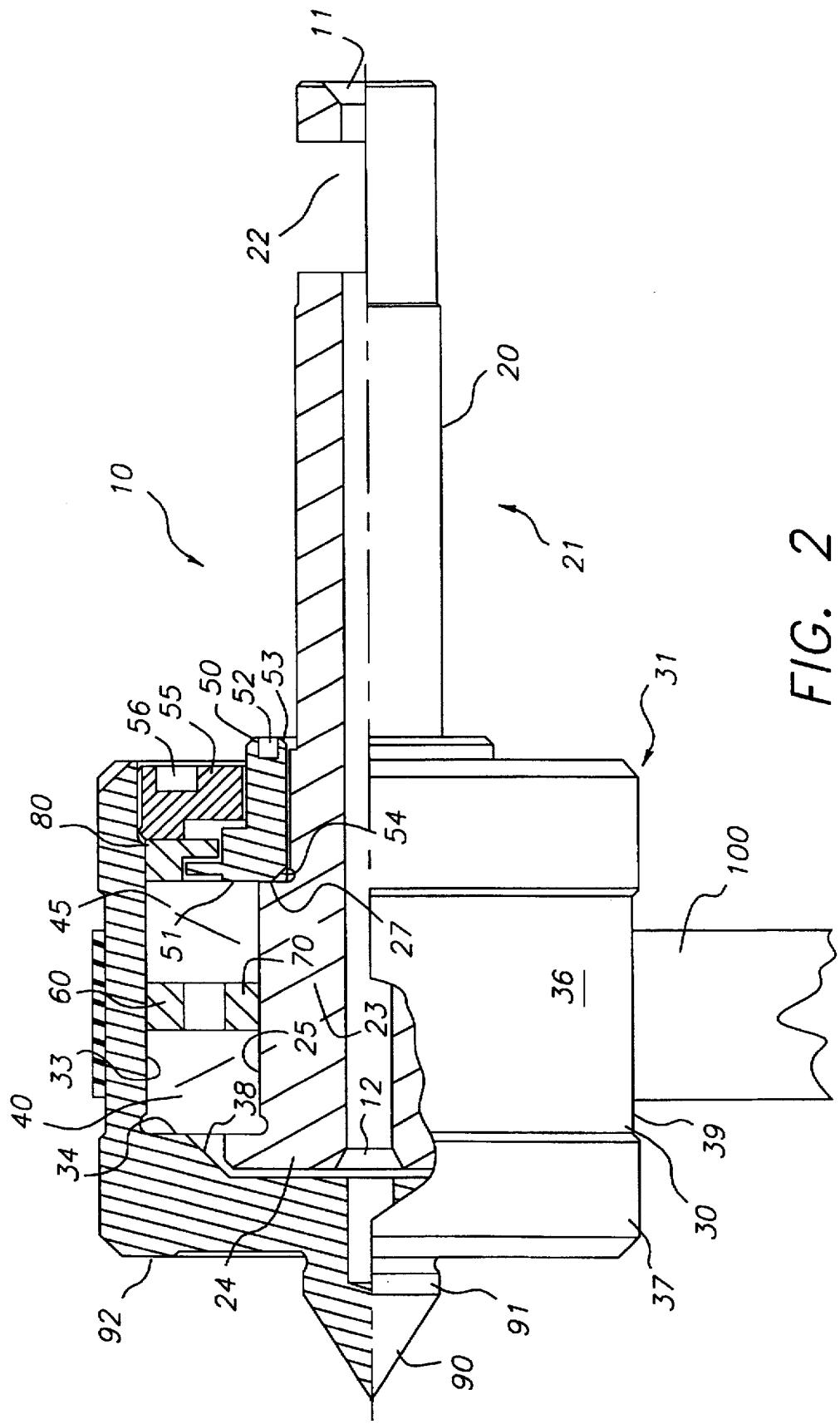

HIGH-PRECISION REVOLVING CENTER

FIELD OF THE INVENTION

The invention relates to precision tools for machine tools, and more particularly to a high-precision revolving center.

BACKGROUND OF THE INVENTION

Revolving centers for machine tools are well known in the art. French patents 2 046 637, 2 133 205 and 2 454 863 describe such revolving centers. These centers generally consist of an elongate hollow body which is fixed to the machine tool and a rotating element disposed inside the body, one pointed end of which projects from the body.

The rotating element is fixed to the body by needle bearings so as to limit any movement perpendicular to the rotation axis. When the weight of the components to be machined is great, it becomes essential to introduce an abutment surface between the body and the rotating element and a bearing resting on this surface. The mounting and structure of such centers do not allow subsequent grinding of the center in order to improve the centering precision of the tip, which remains around 0.01 mm.

SUMMARY OF THE INVENTION

The invention aims to provide a revolving center which has a variation in the position of the axis of around one micrometer and whose tip can be ground after mounting, and a process for manufacturing such a revolving center.

The invention also provides a high-precision revolving center comprising:

- a hollow elongate mounting component, cylindrical about an axis, and a first end of which is designed to hold said revolving center during its use and the other end of which has an external cylindrical surface, centered on the axis, whose diameter is 2 µm less than the internal diameter of two matched prestressed bearings which it is to receive and whose length, parallel to the axis, is defined by a first support surface perpendicular to the axis and a first reference surface strictly orthogonal to the axis and distant from the support surface by a quantity less than 5 µm less than the value of the thicknesses of the two bearings plus the thickness of the braces separating these bearings;
- a center-support casing, with an axis of revolution and having, on the one hand, a first end with a hollow space defined at its bottom by a second reference surface strictly perpendicular to the axis and, at its periphery, an internal surface precisely centered on the axis and whose internal diameter is equal to the external diameter of the two matched prestressed bearings that this space is to receive plus a value of 2 µm and whose length, parallel to the axis, is greater than the value of the thicknesses of the two bearings plus the thickness of the separating braces separating these bearings and, on the other hand, another end provided with a projecting tip having an angle of 60°;
- two matched prestressed bearings, disposed between the mounting piece and the casing, associated with two braces of identical thickness separating them, one having an internal diameter slightly greater than the internal diameter of the two bearings and the other having an external diameter slightly less than the external diameter of the two bearings and
- means for stressing said bearings comprising, on the one hand, a first threaded element fixed to said mounting piece and having a support surface perpendicular to the axis designed to come into contact with the support surface of said mounting piece so as to stress the internal part of said bearings and, on the other hand, a second threaded element fixed to said first end of the casing and bearing, through the distribution brace, on the external part of the bearings so as to be able to regulate, by screwing, the force being exerted on the external part of said bearings.

The invention also provides a process for manufacturing a high-precision revolving center comprising a mounting piece at one of whose ends there are mounted two matched prestressed rolling bearings and a center-support casing adapted to cover said end of the mounting piece and said bearings, and first and second screwing elements mounted respectively on the mounting piece and on the casing so as to stress the bearings. The process comprises the following operations:

- a statistical study of the rotation of a grinder so as to determine its period of optimal operation during which it produces practically perfect cylinders for which the eccentricity error is less than 1 µm.
- the rough machining of the various components forming the high-precision revolving center;
- the grinding of the two cylindrical surfaces designed to receive the prestressed bearings and associated orthogonal faces during the period of optimal operation of the grinder;
- the assembly of the components forming the revolving center;
- the stressing of the bearings;
- the fixing of the mounting piece for the revolving center on a grinder;
- the rotation of the casing about the mounting piece in order to effect the grinding of said center (90) or of the reference face orthogonal to the axis during the optimal period of operation of the grinder.

BRIEF DESCRIPTION OF THE DRAWINGS

Other advantages of the revolving center according to the invention will be revealed in the course of the detailed description which follows, given by way of example and with reference to the accompanying drawing in which:

FIG. 2 depicts a similar view of another embodiment according to the invention.

The same reference numerals are used for similar elements.

DETAILED DESCRIPTION OF THE DRAWINGS

Figure 1:
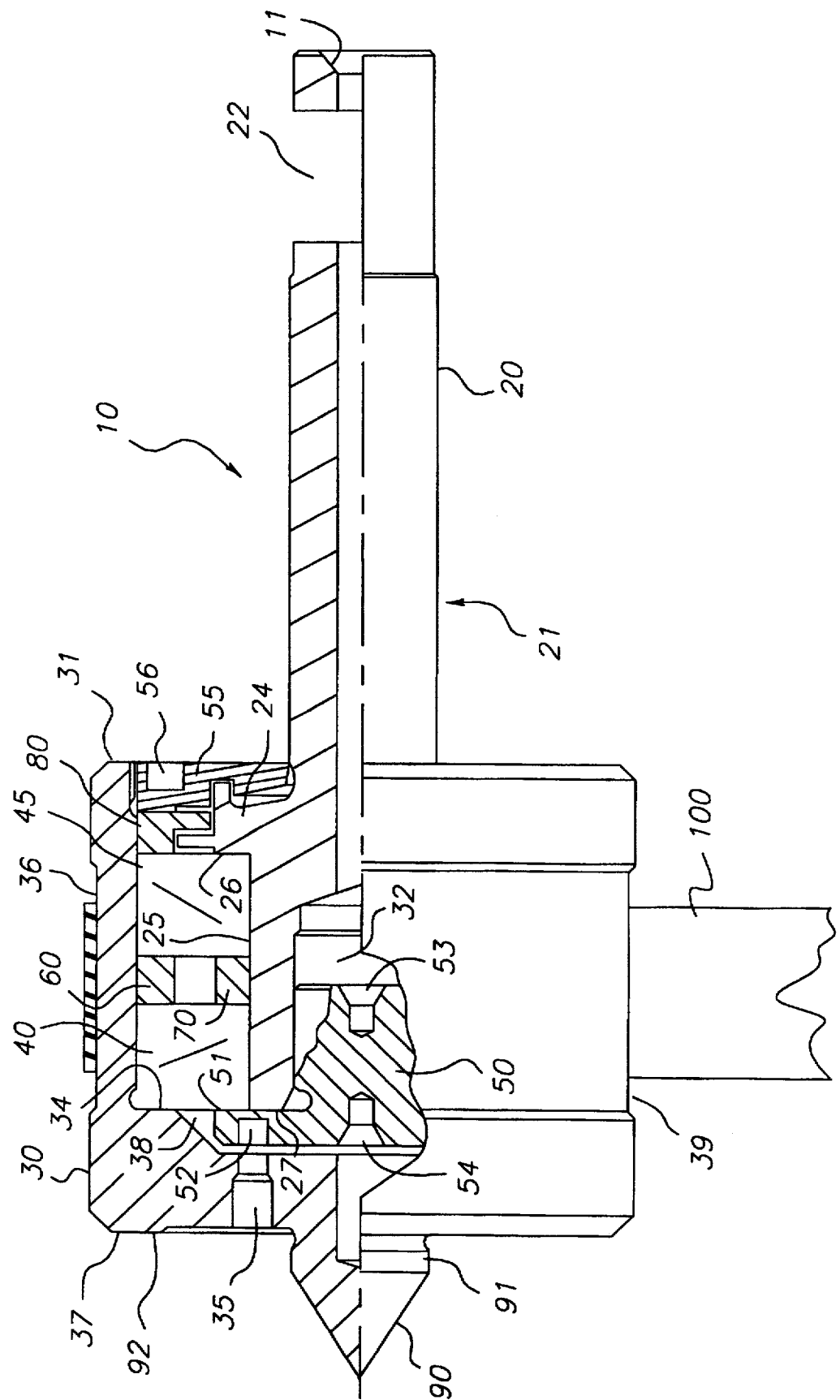
FIG. 1 depicts a view of the center according to the invention in partial cross section or cutaway.

As can be seen in the figures, the revolving center 10 consists of two principal parts: a mounting piece 20 designed to be immobilized on the machine and a center-support casing 30 designed to revolve about the mounting piece 20 by means of bearings 40, 45.

Given the fact that a high-precision center is intended to be obtained, there should be no play due to the bearings, and, to this end, matched prestressed bearings, such as, for example, the bearings sold by the company BARDEN (Danbury, Conn., USA) under the reference 207HDMC 0-9 N12 U. will be used.

The mounting of such types of bearing must take place with a high level of precision in order for the desired effect to be obtained. In fact, for this type of bearing, a stress is exerted on the external and internal cages of the bearings so as to cause the cage to "swell" slightly and obtain a rotation that is free of any play.

The mounting piece 20 preferably consists of a hollow sleeve, which gives it greater rigidity. The sleeve has a first cylindrical end 21, enabling the revolving center 10 to be mounted in the machine. Advantageously, the first end has a slot 22 which enables the mounting piece 10 to be immobilized in the machine. The arithmetic roughness of the machining of the cylindrical end 21 is around 0.2 RA.

The other end 23 of the mounting piece is adapted so as to receive the prestressed bearings 40, 45. This other end has an external cylindrical surface 25 centered on the axis of the mounting piece 20. In the present application, "cylindrical surface centered on the axis" is intended to mean a surface which does not deviate by more than 1 µm from the theoretical surface. This external surface is arranged so as to receive the prestressed bearings 40, 45. To this end, the external diameter of the external cylindrical surface 25 is 2 µm less than the internal diameter of the two matched prestressed bearings 40, 45. This surface is ground with an arithmetic roughness of around 0.2 RA under conditions which will be seen hereinafter so as to obtain the high-precision revolving center according to the invention.

The mounting piece 20 has a shoulder 24 which is machined so as to provide a reference surface 26 strictly orthogonal to the mounting piece. The conditions for machining this reference surface 26 will be explained in detail subsequently.

In the present application, "strictly orthogonal" is intended to mean a surface which does not deviate by more than 1 µm from the theoretical surface.

In order to more easily position the mounting piece during the machining of this piece, each of its ends is provided with a truncated cone 11, 12, which has an angle at its apex of very slightly less than 60°. In the preferred embodiment, the angle at the apex of the truncated cone is 59°55', since the angle at the apex of a centering point is 60°. This arrangement enables the mounting piece to be recentered easily on a grinder. The end of the mounting piece bearing the cylindrical external surface 25 is hollow and provided with a thread enabling a first threaded element 50, which will be described hereinafter, to be fixed to said mounting piece. This end terminates in a support surface 27. In order to enable the prestressed bearings to be introduced onto the cylindrical external surface 25, a very small chamfer is produced on this external surface 25 level with the support surface 27, over a distance of around 4 mm.

The prestressed bearings are separated from each other by two annular separating braces 60, 70 bearing, in one case, on the smaller-diameter cage of the prestressed bearings and, in the other case, on the larger-diameter cage of these bearings. Those surfaces of the braces which are perpendicular to the axis must be strictly parallel. The internal diameter of the brace 70 with the smaller diameter is slightly greater than the internal diameter of the prestressed bearings 40, 45. The external diameter of the brace 60 with the larger diameter is slightly less than the external diameter of the prestressed bearings 40, 45. The difference in thickness at any point on any brace is less then 1 µm.

The distance between the support surface 27 and the reference surface 26 is less, but not by more than 5 µm, than the total value of the thicknesses of the prestressed bearings 40, 45 and the thickness of the separating braces 60, 70. It is evident that, in order to allow a correct mounting of the prestressed bearings on the mounting piece, the area of contact between the reference surface 26 and the cylindrical external surface 25 is provided with a relief groove whose size is around 1 mm.

The assembly formed by the two prestressed bearings 40 and 45 and the separating braces 60 and 70 is held on the mounting piece by the first threaded element 50. This first threaded element 50 has a support surface 51 coming into contact with the smaller-diameter cage of the prestressed bearings. Advantageously, the external diameter of the first threaded element delimiting the support surface 51 is equal to the external diameter of the separating brace 70 with the smaller diameter and the external diameter of the reference surface 26.

The support surface 51 is ground so as to have an arithmetic roughness of around 0.2 RA and an orthogonality with respect to the axis which does not exceed 1 µm. Advantageously, the first threaded element has on each side of its axis two truncated cones 53, 54 whose angle at the apex is equal to 60° and which enable this element to be centered in order to be machined. This first threaded element 50 has two housings 52, preferably blind, at 180° enabling this threaded element 50 to be screwed onto the mounting piece 20. It is evident that a different number of housings can be envisaged.

The center-support casing 30 is bell-shaped and centered on a revolution axis. This casing has a first end 31 with a hollow space 32, which covers the end 23 of the mounting piece 20 on which the prestressed bearings 40, 45 have been shrunk. Said hollow space is delimited by an internal cylindrical surface 33 centered on the axis and machined with precision in the manner described hereinafter so as to obtain practically perfect parallelism with respect to the axis, since the distances between this surface and the axis do not deviate by more than 1 µm from the theoretical value. Furthermore, the arithmetic roughness of this surface is around 0.2 RA.

The internal diameter of the internal cylindrical surface 33 is equal to the external diameter of the prestressed bearings 40, 45, plus a value of 2 µm. Advantageously, to enable the center-support casing 30 to be introduced onto the prestressed bearings 40, 45, a very small chamfer is produced on the internal surface 33 on the introduction side, over a distance of around 4 mm. The length of the internal surface 33 is greater than a value equal to the sum of the thicknesses of the prestressed bearings 40 and 45 plus the thickness of the separating braces 60 or 70. The bottom of the hollow space 32 has a recess 38 enabling the first threaded element 50 to be received. The external diameter of this recess 38 is less than the internal diameter defined by the internal cylindrical surface 33 so as to define a second reference surface 34 between this recess 38 and the internal surface 33.

The second reference surface 34 is machined so as to be strictly orthogonal to the axis of the casing 30 in the manner described hereinafter, and the arithmetic roughness of this surface is preferably less than 0.2 RA. The junction between the second reference surface 34 and the internal surface 33 is provided with a groove so as to leave this part of the casing clear.

As is well known in the art, the other end 37 of the center-support casing 30 is provided with a point 90 having a cant of 60°, a concentricity reference surface 91 centered on the revolution axis of the casing to within less than 1 µm and a perpendicularity reference surface 92 strictly perpendicular to the axis, that is to say to within less than 1 µm with respect to the theoretical surface. The external cylindrical surface 36 of the casing 30 is provided with a groove 39 with a relatively great width and a predetermined depth adapted to receive a belt 100. This belt enables the casing 30 to be set in rotation with respect to the mounting piece 20 so as to machine the center 90, the centering surface 91 and the support surface 92 according to the technique disclosed hereinafter. The casing is held in position on the prestressed bearings 40, 45 by a second threaded element 55 which is screwed into the first end of said casing. The second threaded element 55 is separated from the prestressed bearings by a distribution brace 80 whose faces determining the thickness are practically parallel. The thickness of the brace is constant to within 1 µm and the arithmetic roughness of these faces is around 0.2 RA. The second threaded element 55 is provided with two housings 56 disposed, for example, at 180° with respect to each other. The housings 56 enable the threaded element 55 to be screwed onto the center-support casing 30. It is evident that a different number of housings can be used.

Advantageously, the shoulder 24 of the mounting piece 20 is disposed between the external cylindrical surface 25 and the first end 21. Such an arrangement has the advantage of providing a structure which resists the thrust forces exerted on the center-support casing 30 during the use of the revolving center 10. This resistance arises from the fact that the reference surface 26 serves as a support for the forces transmitted to the mounting piece 20 by the casing and the prestressed bearings; in a particularly advantageous embodiment, the shoulder 24 is connected to the first cylindrical end 21 by rounded parts so as to avoid incipient ruptures.

It will be noted that, in the embodiment depicted in FIG. 2, the first threaded element serves as a stop for the thrust forces exerted by the component to be machined on the center 90 during the machining of said components. This necessitates a large-size threaded element, which increases the length of the revolving center 10.

The shapes of the distribution brace 80, of the second threaded element 55 and either of the shoulder 24 in the embodiment depicted in FIG. 1 or of the first threaded element 50 in the embodiment depicted in FIG. 2, cooperate with each other so as to form a labyrinth, the utility of which will emerge subsequently.

In the embodiment depicted in FIG. 1, the center-support casing 30 is provided with the two openings 35 disposed at 180° with respect to each other so as to be able to correspond to the two housings 52 provided in the first threaded element 50.

The structure of a high-precision revolving center according to the invention has just been described. However, the precision indicated for centerings or for perpendicularity is not necessarily easy to obtain. For this reason, a possible technique will now be described for obtaining the precisions required in order to obtain a revolving center whose eccentricity during rotation is less than 1 µm.

The technique employed in order to obtain the necessary levels of precision takes account of the normal operation of conventional grinders. A grinding workshop generally operates 24 hours a day, six days a week. When, at the start of the working week, the machines are switched on and used for work, it is observed that the precision of the work carried out by each machine changes over time. If the precision of the work carried out by each machine is measured according to the operating time, it is observed that each machine has a particular cycle. Astonishingly, it is found that this cycle is repetitive and is reproduced regularly every week.

A statistical study is therefore carried out, based on the precision with which the grinder operates over time, so as to determine the period during which the grinder provides optimal precision. The operating period during which the grinder supplies components whose eccentricity errors are less than 0.2 µm can thus be determined.

A rough machining of the various elements of the revolving center 10 is carried out. Then the external surface 25, the internal surface 33, the first reference surface 26, the second reference surface 34, the surfaces of the two separating braces 60, 70, the surfaces of the distribution brace 80 and the support surface 51 of the threaded element 50 are ground during the optimal operating phase of the grinder.

When these various surfaces are machined according to the technique previously described, the various components of the center 10 are assembled. First of all, the two prestressed bearings 40, 45 and the internal 70 and external 80 separating braces are mounted with lubrication on the mounting piece 20. The first threaded element 50 is screwed onto the mounting piece in order to immobilize the prestressed bearings. The center-support casing is then mounted on the two prestressed bearings 40 and 45 and on the external separation brace 60. The distribution brace 80 is inserted into the space in the center-support casing 30 and is immobilized by means of the second threaded element 55, which is screwed onto the first end of the casing 30.

Once the various components have been assembled, a pin with a center-point is screwed into each of the openings 35 in the casing 30 so as to cause the center-point of the screw to penetrate the housing 52 corresponding to the first threaded element 50. All these pins therefore fix together the casing 30 and the threaded element 50, which enables the prestressed bearings 40 and 45 to be stressed. It is evident that, with the embodiment depicted in FIG. 2, the first threaded element 50 is accessible and the casing does not need to be pierced to allow pins for fixing the threaded element 50 to the casing 30 to pass through.

In order to establish the prestressing of the bearings 40 and 45, the first threaded element 50 is, first of all, screwed with a first, relatively high torque, for example 4 m.daN, then this first threaded element is unscrewed so as to release the stresses, and is rescrewed with a second, final torque, for example 3.5 m.daN. The second threaded element 55 is then screwed onto the casing with a first, relatively high, torque, for example 4 m.daN, which establishes on the bearings, and through the distribution brace 80, a stress on the bearings 40 and 45. Then this second threaded element 55 is unscrewed in order to release the stresses and is screwed with a second, final torque, for example 3.5 m.daN. It is evident that it would be possible, for stressing the bearings, to start by stressing the external cage of the bearings and then the internal cage. However, it is preferable to start the operation with the internal cage, since the corresponding threaded element comes into abutment against the support surface 27 and assists a correct stressing of the bearings.

Once the stressing of the bearings has been carried out, the pins are unscrewed and replaced by plugs which do not penetrate the housings 52 in the first threaded element 50. Bonded hollow hexagonal screws 6 can be used as a plug. Obviously this operation is not necessary in the embodiment depicted in FIG. 2.

When the center-support casing 30 can rotate once more about the mounting piece 20, the revolving center 10 is, by means of the first end 21 of the mounting piece 20, fixed on a grinding machine. The casing 30 is rotated with respect to the mounting piece and to the grinder by means of a belt 100 introduced into the groove 39 and moved by a motor, not shown. Then, during the optimal operating period of the grinding machine, the precise machining of the conical point 90 having a half angle at the apex of 30°, the concentricity reference surface 91 and the perpendicularity reference surface 92, is effected. (It is evident that the use of the belt 100 for setting the supporting casing 30 in rotation occurs only once during the manufacture of the revolving center 10. The latter is used in the usual manner in which the casing is not set in forced rotation).

Owing to their precision, the concentricity 91 and perpendicularity 92 reference surfaces can serve to true up the machine tool on which the revolving center 10 will be used. Furthermore, these reference surfaces are available to receive sensors for quality control during the machining period.

As stated previously, the prestressed bearings are mounted with lubrication. The utility of the labyrinth formed by the distribution brace 80, the second threaded element 55 and, in the embodiment depicted in FIG. 1, the shoulder 24 or, in the embodiment depicted in FIG. 2, the first threaded element 50, will therefore be understood.

The utility of the first threaded element 50 in the embodiment depicted in FIG. 1 which, because of its solid structure, prevents the lubricant from being able to exit through the central hole in the mounting piece, will also be noted. This advantage is not found in the embodiment unless the central hole in the mounting piece 20 is blocked off by a supplementary component.

Parts List

10. Revolving center
11. truncated cone
12. truncated cone
20. mounting piece
21. first end
22. slot
23. other end
24. shoulder
25. external surface
26. first reference surface
27. support surface
30. center-support casing
31. first end
32. space
33. internal surface
34. second reference surface
35. opening
36. external surface
37. other end
38. recess
39. groove
40. prestressed bearing
45. prestressed bearing
50. first threaded element
51. support surface
52. housing
53. truncated cone
54. truncated cone
55. second threaded element
56. housing
60. separation brace
70. separation brace
80. distribution brace
90. tip
91. concentricity reference surface
92. perpendicularity reference surface
100. belt

I claim:

1. High-precision revolving center comprising:
    a hollow elongate mounting piece, cylindrical about an axis, and a first end of which is designed to hold said revolving center during use and an opposite end of which has an external cylindrical surface, centered on the axis, having a diameter which is 2 μm less than an internal diameter of two matched prestressed bearings which it is to receive and whose length, parallel to the axis, is defined by a first support surface perpendicular to the axis and a first reference surface strictly orthogonal to the axis and distant from the support surface by a quantity less than 5 μm less than the value of the thicknesses of the two bearings plus the thickness of at least two braces separating the two bearings;
    a center-support casing, with an axis of revolution and having, a first end with a hollow space defined in part by a second reference surface strictly perpendicular to the axis of revolution and by an internal surface precisely centered on the axis of revolution, the hollow space internal diameter being equal to the external diameter of the two matched prestressed bearings that the hollow space is to receive plus a value of 2 μm, the hollow space length, parallel to the axis, being greater than the value of the thicknesses of the two bearings plus the thickness of the at least two braces separating the two bearings and a generally conical tip having an angle of approximately 60° projecting from the center-support casing;
    the two matched prestressed bearings, disposed between the mounting piece and the casing, associated with the at least two separating braces of identical thickness separating the two bearings, one of the at least two braces having an internal diameter greater than the internal diameter of the two bearings and another of the at least two braces having an external diameter slightly less than an external diameter of the two bearings; and
    means for stressing said two bearings comprising a first threaded element fixed to said mounting piece and having a second support surface perpendicular to the axis of the mounting piece, the second support surface engaging the first support surface of said mounting piece so as to stress said two bearings, and a second threaded element fixed to said first end of the center-support casing and bearing, through a distribution brace, on the two bearings so as to be able to regulate, by screwing, the force being exerted on two bearings.

2. Center according to claim 1, in which the reference surface of the mounting piece is situated between the first end and the external cylindrical surface of said opposite end and the casing is provided with means, to enable said casing and said first threaded element to be connected together temporarily so as to be able to regulate the screwing torque of said first element on said mounting piece.

3. Center according to claim 2, in which the means for allowing the temporary connection of the casing and first threaded element comprise pins passing through openings in said casing and entering corresponding housings in said first threaded element.

4. Center according to claim 3, in which the openings provided for the pins to pass are closed off by plugs.

5. Center according to claim 4, in which the first threaded element completely closes off the hollow mounting piece.

6. Center according to claim 5, in which the distribution brace, the second threaded element and the mounting piece are arranged so as to form a labyrinth.

7. Center according to claim 4, in which each end of the mounting piece has a bevel directed towards the inside, in the form of a truncated cone, the half-angle at the apex of which is less than 30°.

* * * * *